United States Patent Office 3,539,480
Patented Nov. 10, 1970

3,539,480
THERMOSETTING RESIN COMPOSITIONS COMPRISING POLYVINYL CHLORIDE DISPERSION RESIN
Charles H. Groff, West View, and Edward H. Neuwirth, Coraopolis, Pa., assignors to Watson-Standard Co., a corporation of Pennsylvania
No Drawing. Continuation-in-part of application Ser. No. 381,555, July 9, 1964. This application June 18, 1968, Ser. No. 737,809
Int. Cl. C09d 3/62, 3/66, 3/76
U.S. Cl. 260—23    25 Claims

ABSTRACT OF THE DISCLOSURE

A thermosetting resin composition consisting essentially of about 35% to 55% polyvinyl chloride dispersion resin, about 8% to 25% of a member from the group consisting of ketone formaldehyde resin, arylsulfonamide formaldehyde resin, and rosin derived alkyd resin, about 10% to 35% plasticizer, up to about 7.5% thermosetting resins and the balance solvents.

---

This application is a continuation-in-part of our earlier filed application Ser. No. 381,555, filed July 9, 1964, now abandoned.

The present invention relates to resin compositions and particularly to high solids vinyl compositions of new and unique characteristics. While the composition of this invention has particular utility for coating the internal surfaces of cans, bottle caps and other metal surfaces for the food processing industry and will be generally described in that context, it has far wider reaching areas and may be used for coating any surface, and as an adhesive for gasket forming materials such as vinyl plastisols and rubber latex compounds.

Prior to the present invention many types of coatings have been used on can interiors, bottle cap interiors and similar metal surfaces for food packaging and processing. For such uses the coating must be odorless, nontoxic, chemical resistant, formable in dies after application without breaking the coating film and readily applied at high speed in sufficient coating thickness to protect the metal surface. No prior coating has completely met these requirements. Two of the most common coatings are (1) solutions of thermosetting vinyls in appropriate carriers and solvents and (2) suspensions of vinyl resins, e.g., plastisols and organosols. In the case of solution systems, basically solutions of vinyl-copolymer resins, expensive solvents must be used and the total solids level which can be attained is relatively low approximating 24% as a general maximum. The solution systems had quite satisfactory adhesion properties to metal surfaces but the low solids content has made it difficult to obtain a sufficient thickness of coating to provide the necessary protection. Moreover, the excessive amounts of solvent required in such systems make them uneconomical in many uses. In the case of the suspension systems which are basically suspension of high molecular weight virtually insoluble vinyl resins, the dispersion may have quite high solids contents, as for example 80% to 85%, in inexpensive suspending media. These suspension systems have virtually no adhesive character toward metal surfaces and can be molded in metal molds from which they strip readily. They require separate adhesive primers to adhere them to metal surfaces and they have poor resistance to boiling water and steam. The problem facing the art, particularly of metal coating, has been to get the high vinyl solids characteristic of suspension systems with the adhesive and thermosetting characteristics of solvent systems, coupled with resistance to boiling water and steam. Prior to the present invention such a composition was not available.

We have discovered a high solids vinyl composition which has adhesive and thermosetting properties comparable to those of solution vinyl systems and which will withstand boiling water and steam at 250° F. for at least 1 hour without blistering or blushing. A composition according to our invention may contain solids in the range of 80% to 84% comparable to suspension systems but, unlike suspension systems, our composition will flow uniformly and adhere to metal surfaces like the low solids solution systems.

The material of our invention may be applied by conventional forward roller coating machines just as solution systems are applied or applied by spray, dip, knife, or flowcoat. When applied the material of our invention has superior extensibility and fabricating properties. It is the first coating material which will not fail by fracture, prior to the metal on which it is coated, when tested as a coated metal sheet in an Erichsen tester. In addition to the foregoing advantages the composition of our invention has high adhesion for vinyl plastisol gaskets, such as are used in glass jar closures, which most solution coatings do not have.

Preferably, the composition of our invention is made up of a polyvinyl chloride dispersion resin, a member from the group consisting or arylsulfonamide formaldehyde condensation resins, rosin derived alkyd type resins, and ketone aldehyde resins, plasticizers, thermosetting resins and solvents, stabilizers and/or lubricants may be added if desired together with pigments or colorants. Preferably the polyvinyl chloride dispersion resin is an organosol resin which is emulsion polymerized with surfactant. For example, we prefer such organosol resins as Opalon 410 and VR–50 both of which are polyvinyl chloride polymer resins and similar resins which do not blush in boiling water. Such organosol resins are well known and commercially available. They are described in Rubber Age. vol. 67, No. 5, August 1950, at pages 553 to 560. Among the ketone aldehydes we prefer methyl-ethyl ketone formaldehyde and cyclo hexanone-formaldehyde. As plasticizers we may use an ester, polyester or epoxidized oil types such as di-2-hexa-ethyl phthalate, polyglycol esters of sebacic acid, polyglycol esters of adipic acid, dioctyl adipate, dioctyl azelate, diethyleneglycol sebacate, epoxidized soy bean oil, epoxidized linseed oil, epoxidized tall oil, epoxidized esters of fatty acids and polyglycol dibasic esters generally. As thermosetting resins we prefer epoxy resins, melamine resins, urea resins and their homologues. For example, we prefer hexa-methoxy methyl melamine, diallylmelamine, melamine formaldehyde, urea formaldehyde, the condensation products of epichlorhydrin and bisphenol A with molecular weights under 1000. Among low cost solvents we prefer ketones such as di-iso-butyl ketone, aliphatic hydrocarbons such as mineral spirits (aliphatic petroleum cut) and glycol ether solvents such as ethyl ether of ethylene glycol and butyl ether of ethylene glycol. Among resin stabilizers we prefer calcium-zinc soaps and the like.

As lubricants we prefer paraffin waxes and petroleum jellys. Pigments and colorants may be added such as $TiO_2$ and dark petroleum resins.

In a preferred broad composition we provide:

| | Percent |
|---|---|
| Polyvinyl chloride dispersion resin | 35 to 55 |
| A member from the group consisting of arylsulfonamide formaldehyde condensation resins, rosin derived alkyd type resins and ketone-formaldehyde resin | 8 to 25 |
| Plasticizer | 10 to 35 |
| Thermosetting resins | 0 to 7.5 |
| Solvent | Balance |

The subject matter of this invention can perhaps best be understood by reference to specific examples of compositions according to our invention. Such examples appear in Table I hereafter. In Table I, trade names are used to identify certain chemicals. These trade names are more fully defined as follows: Opalon 410 and VR–50 are both polyvinyl chloride polymer resins; MR–77 is a methyl ethyl ketone aldehyde condensation product produced by Mohawk Industries Inc.; Polyketone resin is methyl ethyl ketone formaldehyde resin produced by Union Carbide; Santolite MHP is an arylsulfonamide formaldehyde resin produced by Monsanto; Neolyn 23 is a rosin-derived alkyd resin produced by Hercules Powder Company; Epon 816 is biphenol-epichlorhydrin reaction product; G 62 is an epoxidized oil plasticizer; G 25 is a polyester plasticizer; Epon 828 is an epoxy resin; Nebony is a dark petroleum resin; DIBK is a ketone solvent; Cellosolve is a glycol-ether solvent; Flexo-Wax C is a wax lubricant.

TABLE II

| Class | Composition Percent | Type |
|---|---|---|
| Polyvinyl chloride dispersion resin | 41.3 | VR–50. |
| Arylsulfonamide formaldehyde resin | 10.5 | Sanolite MHP. |
| Plasticizer—ester type | 15.5 | Dioctyl phthalate. |
| Plasticizer—epoxidized oil type | 1.2 | G62. |
| Epoxy resin | 4.2 | Epon 828. |
| Melamine resin | 0.8 | Hexa-methoxy methyl melamine. |
| Ketone solvent | 16.5 | DIBK. |
| Aliphatic hydrocarbon solvent | 5.8 | Mineral spirits. |
| Glycol ether solvent | 4.2 | Cellosolve. |

TABLE III

| Class | Composition Percent | Type |
|---|---|---|
| Polyvinyl chloride dispersion resin | 44.5 | VR–50. |
| Rosin-derived alkyd resin | 11.1 | Neolyn 23. |
| Plasticizer—ester type | 15.6 | Dioctyl phthalate. |
| Plasticizer—epoxidized oil type | 2.2 | G62. |
| Epoxy resin | 4.5 | Epon 828. |
| Melamine resin | 1.1 | Hexa-methoxy methyl melamine. |
| Ketone solvent | 10.6 | DIBK. |
| Aliphatic hydrocarbon solvent | 6.0 | Mineral spirits. |
| Glycol ether solvent | 4.4 | Cellosolve. |

The A-type compositions are particularly adapted for metal coating. They have a viscosity of 120–150″ at 77° F. on the No. 4 Ford cup and a weight per gallon of about 9.2 to 9.7 pounds. These compositions may be readily applied by the roller coating machine to materials such as tinplate, sized plates, aluminum and blackplate, or spray applied to fabricated containers such as tinplate cans.

TABLE I

| | A type | | | B type | | | C type | | | D type | | | | |
|---|---|---|---|---|---|---|---|---|---|---|---|---|---|---|
| Class | Clear | Buff | Gold | Gold | Buff | Clear | Gold | Buff | Clear | Gold | Clear | Buff | Gold | Gold |
| Polyvinyl chloride dispersion resin: | | | | | | | | | | | | | | |
| Percent | 51.2 | 44.6 | 51.0 | 39.8 | 38.5 | 42.1 | 37.0 | 35.5 | 44.5 | 39.8 | 45.2 | 40 | 43 | 46.4 |
| Type | (1) | (1) | (1) | (2) | (2) | (2) | (3) | (3) | (3) | (1) | (1) | (1) | (1) | (1) |
| Ketone-formaldehyde resin: | | | | | | | | | | | | | | |
| Percent | 12.9 | 12.5 | 12.8 | 19.9 | 20.4 | 21.1 | 9.25 | 9.8 | 11.1 | 10.0 | 11.3 | 11.2 | 10.7 | 11.6 |
| Type | (4) | (4) | (4) | (4) | (4) | (4) | (5) | (5) | (5) | (5) | (5) | (5) | (5) | (5) |
| Plasticizer-monomeric ester type: | | | | | | | | | | | | | | |
| Percent | 15.4 | 15.2 | 15.3 | 12.0 | 11.5 | 30 | | | | | | | | |
| Type | (6) | (6) | (6) | (6) | (6) | (6) | | | | | | | | |
| Plasticizer-polyester type: | | | | | | | | | | | | | | |
| Percent | | | | | 1.5 | | 12.9 | 13.8 | 15.6 | 13.9 | 15.8 | 14, 1.6 | 15 | 9.3 |
| Type | | | | | G25 | | G25 | G25 | (7) | G25 | G54 | G54, G25 | G54 | G54 |
| Plasticizer-eposidized oil type: | | | | | | | | | | | | | | |
| Percent | 5.1 | 4.5 | 5.1 | 4.0 | 3.8 | 4.2 | 1.85 | 1.8 | 2.2 | 2.0 | 2.3 | 2 | 2.1 | 2.3 |
| Type | G62 | G62 | G62 | G62 | G62 | G62 | G62 | G62 | G62 | G62 | G62 | G62 | G62 | G62 |
| Epoxy resin: | | | | | | | | | | | | | | |
| Percent | | | | 4.0 | 3.8 | 4.2 | | | | 4.0 | 4.5 | 4 | 4.3 | 4.7 |
| Type | | | | (8) | (8) | (8) | | | | (8) | (8) | (8) | (8) | (8) |
| Melamine resin: | | | | | | | | | | | | | | |
| Percent | | | | 1.0 | 0.9 | 1.05 | | | | 1.0 | 1.1 | 1.0 | 1.1 | 1.4 |
| Type | | | | (9) | (9) | (10) | | | | (9) | (11) | (11) | (11) | (11) |
| Dark petroleum resin (for color): | | | | | | | | | | | | | | |
| Percent | | 3.1 | | 3.2 | | | 2.25 | | | 2.4 | | | 3.2 | 2.8 |
| Type | | (12) | | (12) | | | (12) | | | (12) | | | (12) | (12) |
| Pigment: | | | | | | | | | | | | | | |
| Percent | | 6.5 | | | 5.4 | | | 5.1 | | | | 5.6 | | |
| Type | | (13) | | | (13) | | | (13) | | | | (13) | | |
| Ketone solvent: | | | | | | | | | | | | | | |
| Percent | 7.7 | 8.4 | 6.8 | 7.2 | 7.8 | 6.3 | 17.3 | 38.8 | 13.3 | 14.3 | 9.2 | 9.6 | 9.6 | 13.4 |
| Type | (14) | (14) | (14) | (14) | (14) | (14) | (14) | (14) | (14) | (14) | (14) | (14) | (14) | (14) |
| Aliphatic hydrocarbon solvent: | | | | | | | | | | | | | | |
| Percent | 7.7 | 8.4 | 6.8 | 7.2 | 7.4 | 6.3 | 17.3 | 38.8 | 8.9 | 8.8 | 6.1 | 6.5 | 6.7 | 3.1 |
| Type | (15) | (15) | (15) | (15) | (15) | (15) | (15) | (15) | (15) | (15) | (15) | (15) | (15) | (15) |
| Glycol-ether solvent: | | | | | | | | | | | | | | |
| Percent | | | | 1.8 | 1.9 | 2.1 | 2.3 | 6 | 4.5 | 4.0 | 4.5 | 4 | 4.3 | 4.7 |
| Type | | | | (16) | (16) | (16) | (16) | (16) | (16) | (16) | (16) | (16) | (16) | (16) |
| Stabilizers: | | | | | | | | | | | | | | |
| Percent | | | | | | | | | | | | 0.4 | | |
| Type | | | | | | | | | | | | (17) | | |
| Lubricant: | | | | | | | | | | | | | | |
| Percent | | | | | 0.8 | | | | | | | | | 0.3 |
| Type | | | | | (18) | | | | | | | | | (18) |

[1] VR–50.
[2] Opalon 410.
[3] QYNV.
[4] MR–77.
[5] Polyketone 251.
[6] Dioctyl phthalate
[7] Emery 9789.
[8] Epon 816.
[9] Hexamethoxy methyl melamine 300.
[10] Diallyl melamine.
[11] Hexamethoxy methyl melamine 301.
[12] Nebony 100.
[13] $TiO_2$.
[14] DIBK.
[15] Min. Spts.
[16] Cellosolve.
[17] Ferro 760X.
[18] Flexo-Wax C.

Compositions of the B-type are similarly well adapted to metal coating. They generally have a viscosity of about 900 to 1400 cps. at 77° F. using the No. 4 spindle at 30 r.p.m. on the Brookfield viscometer (LVF Model). B-type compositions are readily applied by the roller coating machine to materials such as tinplate, aluminum, sized plates, black-plate and the like or spray applied to fabricated cans.

Compositions identified in the table as C-type generally have viscosites of 120–150″ at 77° F. on a No. 4 Ford cup and weight per gallon of about 8.5 to 9.5 pounds. These materials may be applied by roller coating machines to tinplate, aluminum, crown plate, sized plate and the like.

The D-type compositions are particularly adapted for interior finishes or coating for closures with or without plastisol gaskets. These materials have viscosities generally of 120 to 150″ at 77° F. on a No. 4 Ford cup with weights of about 8.5 to 9.5 pounds per gallon. They may be applied by a roller coating machine to tinplate, crown plate, aluminum, sized plates or the like.

The compositions set out in Table I all incorporate ketone-aldehyde resins. Similar compositions in which arylsulfonamide formaldehyde condensation resins and rosin derived alkyd type resins are substituted for the ketone aldehyde resins are shown in Tables II and III.

It will be apparent from the foregoing description that we have invented a new high solids vinyl composition having the best characteristics of both solution and suspension systems of vinyl but without their individual deficiencies. They provide an entirely new class of coatings from those previously available to the metal decorating industry. At the same time they provide a material which may, in itself, be useful as gasket sealants. Since the compositions of our invention provide for cross-linking of the resins, they are properly described as thermosetting vinyls. These compositions, as coatings, have solids in the range 65% to 85% which is approximately two to three times the solids range of standard thermosetting vinyl solution coatings. It is therefore proper to describe these materials as high solids thermosetting vinyls, materials not heretofore available.

While we have set out certain preferred compositions and embodiments of our invention in the foregoing specification, it will be understood that this invention may be otherwise embodied within the scope of the following claims.

We claim:

1. A thermosetting resin composition consisting essentially of about 35% to 55% polyvinyl chloride dispersion resin, about 8% to 25% of a member from the group consisting of ketone formaldehyde resin, arylsulfonamide formaldehyde resin and rosin derived alkyd resin, about 10% to 35% plasticizer, up to about 7.5% thermosetting resins from the group consisting of epoxy resins and amino resins and the balance solvents.

2. A resin composition as claimed in claim 1 wherein the polyvinyl chloride resin is an organosol resin.

3. A resin composition as claimed in claim 1 wherein the ketone formaldehyde resin is selected from the group consisting of methyl-ethyl ketone formaldehyde and cyclo hexanone-formaldehyde resin.

4. A resin composition as claimed in claim 1 wherein the plasticizer is selected from one of the group consisting of monomeric esters, polyesters and epoxidized fatty oils.

5. A resin composition as claimed in claim 1 wherein the thermosetting resin is a mixture of a melamine formaldeyhde resin and an epoxy resin of bisphenol epichlorhydrin.

6. A thermosetting resin composition consisting essentially of about 35% to 55% polyvinyl chloride dispersion resin, about 8% to 25% of a member from the group consisting of ketone formaldehyde resin, arlysulfonamide formaldehyde resin and rosin derived alkyd resin, about 10% to 35% plasticizer, up to about 7.5% thermosetting resins from the group consisting of epoxy resins and amino resins, up to about 1% of a resin stabilizer and the balance solvents.

7. A thermosetting resin composition consisting essentially of about 35% to 55% polyvinyl chloride dispersion resin, about 8% to 25% of a member from the group consisting of ketone formaldehyde resin, arylsulfonamide formaldehyde resin and rosin derived alkyd resin, about 10% to 35% plasticizer, up to about 7.5% thermosetting resins from the group consisting of epoxy resins and amino resins, up to about 1% of a lubricant and the balance solvents.

8. A resin coating composition consisting essentially of about a 65% to 85% solids mixture consisting of about 35 to 55 parts polyvinyl chloride dispersion resin, about 8 to 25 parts ketone aldehyde resin, about 10 to 35 parts plasticizer, up to about 7.5 parts thermosetting resins from the group consisting of epoxy resins and amino resins in about 15% to 35% of solvents.

9. A resin composition as claimed in claim 8 wherein the polyvinyl chloride resin is an organosol resin.

10. A resin coating composition consisting essentially of about a 65% to 85% solids mixture consisting of about 35 to 55 parts polyvinyl chloride dispersion resin, about 8 to 25 parts ketone aldehyde resin, about 10 to 35 parts plasticizer, up to about 7.5 parts thermosetting resins from the group consisting of epoxy resins and amino resins in about 15% to 35% of solvents and up to about 1 part of a vinyl resin stabilizer.

11. A resin coating composition consisting essentially of about a 65% to 85% solids mixture consisting of about 35 to 55 parts polyvinyl chloride dispersion resin, about 8 to 25 parts ketone aldehyde resin, about 10 to 35 parts plasticizer, up to about 7.5 parts thermosetting resins from the group consisting of epoxy resins and amino resins in about 15% to 35% of solvents and up to about 1 part of a lubricant.

12. A thermosetting resin composition consisting essentially of about 35% to 55% polyvinyl chloride dispersion resin, about 8% to 25% ketone formaldehyde resin, about 10% to 35% plasticizer, up to about 7.5% of one or more thermosetting resins selected from the group consisting of epoxy resins, melamine resins and urea resins, and the balance solvents.

13. A resin composition as claimed in claim 12 wherein the polyvinyl chloride resin is an organosol resin.

14. A resin composition as claimed in claim 12 wherein the ketone formaldehyde resin is selected from the group consisting of methyl-ethyl ketone formaldehyde and cyclo hexanone-formaldehyde resin.

15. A resin composition as claimed in claim 12 wherein the plasticizer is selected from one of the group consisting of monomeric esters, polyesters, and epoxidized fatty oils.

16. A resin composition as claimed in claim 12 wherein the thermosetting resin is a mixture of a melamine formaldehyde resin and an epoxy resin of bisphenol epichlorhydrin.

17. A thermosetting resin composition consisting essentially of about 35% to 55% polyvinyl chloride dispersion resin, about 8% to 25% ketone formaldehyde resin, about 10% to 35% plasticizer, up to about 7.5% of one or more thermosetting resins selected from the group consisting of epoxy resins, melamine resins and urea resins, up to about 1% of a resin stabilizer and the balance solvents.

18. A thermosetting resin composition consisting essentially of about 35% to 55% polyvinyl chloride dispersion resin, about 8% to 25% ketone formaldehyde resin, about 10% to 35% plasticizer, up to about 7.5% of one or more thermosetting resins selected from the group consisting of epoxy resins, melamine resins and urea resins, up to about 1% of a lubricant and the balance solvents.

19. A resin coating composition consisting essentially of about a 65% to 85% solids mixture consisting of about 35 to 55 parts polyvinyl chloride dispersion resin, about 8 to 25 parts ketone formaldehyde resins, about 10 to 35 parts plasticizer, up to about 7.5 parts of one or more thermosetting resins selected from the group consisting of epoxy resins, melamine resins and urea resins, in about 15% to 35% of solvents.

20. A resin coating composition consisting essentially of about a 65% to 85% solids mixture consisting of about 35 to 55 parts polyvinyl chloride dispersion resin, about 8 to 25 parts ketone formaldehyde resin, about 10 to 35 parts plasticizer, up to about 7.5 parts of one or more thermosetting resins selected from the group consisting of epoxy resins, melamine resins and urea resins, up to about 1 part of a vinyl resin stabilizer in about 15% to 35% of solvents.

21. A resin coating composition consisting essentially of about a 65% to 85% solids mixture consisting of about 35 to 55 parts polyvinyl chloride dispersion resin, about 8 to 25 parts ketone formaldehyde resin, about 10 to 35 parts plasticizer, up to about 7.5 parts of one or more thermosetting resins selected from the group consisting of epoxy resins, melamine resins and urea resins, up to about 1 part of a lubricant in about 15% to 35% of solvents.

22. A metal surface having a coating thereon consisting essentially of a cured film formed from about 35 to 55 parts polyvinyl chloride dispersion resin, about 8 to 25 parts ketone formaldehyde resin, about 10 to 35 parts plasticizer, and up to about 7.5 parts thermosetting resins from the group consisting of epoxy resins and amino resins.

23. A metal surface having a coating thereon as claimed in claim 22 wherein the polyvinyl chloride resin is an organosol resin.

24. A metal surface having a coating thereon consisting essentially of a cured film formed from about 35 to 55 parts polyvinyl chloride dispersion resin, about 8 to 25 parts ketone formaldehyde resin, about 10 to 35 parts plasticizer, and up to about 7.5 parts of one or more thermosetting resins selected from the group consisting of epoxy resins, melamine resins and urea resins.

25. A metal surface having a coating thereon as claimed in claim 24 wherein the polyvinyl chloride resin is an organosol resin.

References Cited
UNITED STATES PATENTS

| | | | |
|---|---|---|---|
| 3,075,935 | 1/1963 | De Shay | 260—29.6 |
| 3,117,693 | 1/1964 | Vogel | 220—64 |
| 3,122,523 | 2/1964 | Josten | 260—64 |
| 3,137,666 | 6/1964 | Lox et al. | 260—19 |
| 3,183,117 | 5/1965 | Yuska et al. | 117—132 |
| 3,231,393 | 1/1966 | Downing et al. | 99—181 |
| 3,305,602 | 2/1967 | Bromstead | 260—853 |

DONALD E. CZAJA, Primary Examiner

R. W. GRIFFIN, Assistant Examiner

U.S. Cl. X.R.

117—122, 132, 161, 168; 220—64; 260—21, 26, 28.5, 31.6, 32.8, 33.6, 828, 837, 853, 873